United States Patent
Kim et al.

(10) Patent No.: US 9,328,896 B2
(45) Date of Patent: May 3, 2016

(54) LENS FOR CONTROLLING ILLUMINANCE DISTRIBUTION AND LIGHT-EMITTING DIODE PACKAGE INCLUDING THE LENS

(71) Applicant: SAMSUNG ELECTRONICS CO., LTD., Suwon-si, Gyeonggi-do (KR)

(72) Inventors: Yong-ju Kim, Incheon (KR); Sang-woo Ha, Seongnam-si (KR); Chin-woo Kim, Hwaseong-si (KR); Jin-ha Kim, Yongin-si (KR)

(73) Assignee: SAMSUNG ELECTRONICS CO., LTD., Suwon-Si, Gyeonggi-Do (KR)

(*) Notice: Subject to any disclaimer, the term of this patent is extended or adjusted under 35 U.S.C. 154(b) by 167 days.

(21) Appl. No.: 14/144,425

(22) Filed: Dec. 30, 2013

(65) Prior Publication Data
US 2014/0204591 A1    Jul. 24, 2014

(30) Foreign Application Priority Data
Jan. 22, 2013 (KR) .......... 10-2013-0007094

(51) Int. Cl.
| F21V 1/00 | (2006.01) |
| F21V 5/04 | (2006.01) |
| G02B 19/00 | (2006.01) |
| F21V 5/00 | (2015.01) |
| F21Y 101/02 | (2006.01) |

(52) U.S. Cl.
CPC .......... F21V 5/04 (2013.01); G02B 19/0061 (2013.01); F21V 5/004 (2013.01); F21V 5/045 (2013.01); F21Y 2101/02 (2013.01)

(58) Field of Classification Search
CPC .......... F21V 5/04; F21V 5/041; F21V 5/046
USPC .......... 362/311.01, 311.02
See application file for complete search history.

(56) References Cited

U.S. PATENT DOCUMENTS

| 5,526,190 | A  * | 6/1996  | Hubble, et al. .......... 359/719 |
| 7,352,011 | B2 * | 4/2008  | Smits et al. .......... 257/99 |
| 8,210,722 | B2   | 7/2012  | Holder et al. |
| 8,215,814 | B2   | 7/2012  | Marcoux |
| 8,324,790 | B1 * | 12/2012 | Hu .......... 313/113 |
| 8,956,010 | B2 * | 2/2015  | Huang .......... 362/246 |
| 2005/0201101 | A1 * | 9/2005  | Shimura .......... 362/330 |
| 2009/0268471 | A1 * | 10/2009 | Chen et al. .......... 362/335 |
| 2009/0321767 | A1 * | 12/2009 | Shih et al. .......... 257/98 |

(Continued)

FOREIGN PATENT DOCUMENTS

| JP | 2010231976 A | 10/2010 |
| KR | 1020090128103 A | 12/2009 |

(Continued)

*Primary Examiner* — Ali Alavi
(74) *Attorney, Agent, or Firm* — McDermott Will & Emery LLP

(57) ABSTRACT

A lens for controlling an illuminance distribution to realize high luminous flux efficiency by maintaining a required beam angle and uniformity on an illumination surface having a particular shape, such as a square shape, and a light-emitting diode (LED) package including the lens are provided. The lens includes an incidence surface onto which light emitted from a light-emitting device is incident, and an emission surface through which the light incident onto the incidence surface is emitted. An illuminance controller, which includes at least two optical devices, is disposed on the emission surface to control an illuminance distribution of the emission surface.

19 Claims, 12 Drawing Sheets

(56) References Cited

U.S. PATENT DOCUMENTS

| | | | |
|---|---|---|---|
| 2010/0073937 A1* | 3/2010 | Ho | 362/335 |
| 2010/0149801 A1 | 6/2010 | Lo et al. | |
| 2013/0176724 A1* | 7/2013 | Yang et al. | 362/231 |
| 2014/0226332 A1* | 8/2014 | Chen | 362/249.02 |

FOREIGN PATENT DOCUMENTS

| | | |
|---|---|---|
| KR | 102010-0065607 A | 6/2010 |
| KR | 20100068313 | 6/2010 |
| KR | 1020110138866 A | 12/2011 |
| KR | 1020120079665 A | 7/2012 |

* cited by examiner

LENS FOR CONTROLLING ILLUMINANCE DISTRIBUTION AND LIGHT-EMITTING DIODE PACKAGE INCLUDING THE LENS

CROSS-REFERENCE TO RELATED APPLICATION

This application claims the benefit of priority to Korean Patent Application No. 10-2013-0007094, filed on Jan. 22, 2013, in the Korean Intellectual Property Office, the disclosure of which is incorporated herein in its entirety by reference.

TECHNICAL FIELD

The inventive concept relates to a light-emitting diode (LED), and more particularly, to a lens of an LED used for illumination or a flash and an LED package including the lens.

BACKGROUND

A light-emitting device, such as an LED or the like, has a higher power consumption characteristic and is smaller than a fluorescent lamp, an incandescent lamp, or the like, and thus, it has been used in various types of applications. In particular, the LED has recently taken center stage as a flash light source in a digital camera installed in a mobile electronic device.

To efficiently use an LED in a camera, light is not simply irradiated but is efficiently irradiated according to a viewing angle of the camera. A lens is used to efficiently irradiate light and may be designed in consideration of a beam angle, uniformity, luminous flux efficiency, etc. that are required. The lens converts a luminous flux of the LED for functions as described above, and thus, is referred to as a luminous flux converting lens.

SUMMARY

The disclosure provides a lens for controlling an illuminance distribution to realize a high luminous flux efficiency by maintaining a required beam angle and uniformity on an illumination surface having a particular shape, such as a square shape, and a light-emitting diode (LED) package including the lens.

According to an aspect of the disclosure, there is provided a lens for controlling an illuminance distribution. The lens may include an incidence surface onto which light emitted from a light-emitting device is incident, and an emission surface through which the light incident onto the incidence surface is emitted. An illuminance controller, which includes at least two optical devices, is disposed on the emission surface to control an illuminance distribution of the emission surface.

The emission surface may be formed as a flat surface. The optical devices may be lenses having spherical or aspherical surfaces that are convex or concave with respect to the emission surface. The optical devices may also be prisms having polygonal surfaces that are convex or concave with respect to the emission surface.

The lens may further include a protrusion which includes an outer surface that connects the incidence surface and the emission surface to each other and reflects the light incident onto the incidence surface toward the emission surface, and a surface that protrudes from an upper part of the outer surface in an outward horizontal direction and constitutes a part of the emission surface.

The incidence surface may be formed along a recess that is dented toward the emission surface and may include a refractive surface that constitutes a bottom of the recess and is convex toward the light-emitting device, and an inner surface that is connected to the refractive surface to constitute a side of the recess.

In certain embodiments, the emission surface may have a substantially square flat structure. The illuminance controller may include five lenses that are respectively disposed at a center region of the substantially square flat structure and at four regions between a center and four vertexes of the substantially square flat structure. In certain other embodiments, the illuminance controller may include two lenses that are adjacent to two vertexes corresponding to a diagonal line across the square flat structure.

In certain embodiments, the emission surface may have a substantially square flat structure, and the illuminance controller may include four prisms that are disposed along respective sides of the square flat structure. The prisms have substantially rectangular bottoms that extend along the sides of the substantially square flat structure, and sections taken along the sides have shapes in which each two right triangles are connected to each other in an M-shaped structure.

In certain embodiments, the illuminance controller may be a structure in which lenses having semicircular pillar structures intersect with one another.

In certain embodiments, the emission surface has a hemispherical shape, and the lens further comprises a protrusion that protrudes from an edge of the emission surface in an outward horizontal direction.

According to another aspect of the disclosure, there is provided a light-emitting diode (LED) package including an LED chip, and a printed circuit board (PCB) on which the LED chip is mounted. A lens, which controls an illuminance distribution, is arranged above the LED chip, and includes an incidence surface onto which light emitted from the LED chip is incident, and an emission surface that emits the light incident onto the incidence surface. An illuminance controller that includes at least two optical devices is disposed on the emission surface to control an illuminance distribution of the emission surface.

In certain embodiments, the emission surface is formed as a substantially flat surface, and the optical devices are lenses that have spherical or aspherical surfaces that are convex or concave with respect to the emission surface, or prisms having polygonal surfaces that are convex or concave with respect to the emission surface.

The lens may include a protrusion including an outer surface that connects the incidence surface and the emission surface to each other and reflects the light incident onto the incidence surface toward the emission surface, and a surface that protrudes from an upper part of the outer surface and constitutes a part of the emission surface. The LED package may further include a support member that is combined with the PCB and encloses the outer surface. The lens may be combined with the support member through the protrusion.

In certain embodiments, the incidence surface may be formed along a recess that is dented toward the emission surface and may include a refractive surface that constitutes a bottom of the recess and is convex toward the LED chip, and an inner surface that is connected to the refractive surface to constitute a side of the recess. The LED chip may be spaced apart from the refractive surface.

In certain embodiments, the emission surface may have a square flat structure to correspond to the LED chip having a substantially square structure. The illuminance controller may include five lenses that are respectively formed at a center region of the substantially square flat structure and at four regions between a center and four vertexes of the substantially square flat structure.

In another aspect of the disclosure, a lens for controlling an illuminance distribution is provided. The lens is substantially parabolic-shaped when viewed in cross section. The lens comprises a recess in a lower surface of the lens for receiving light emitted from a light-emitting device. The lens also comprises a substantially flat upper surface and a plurality of convex regions disposed on the upper surface through which the light received from the light-emitting device is emitted. A curved surface connects the recess and the upper surface. The curved surface reflects the light received from the light-emitting device toward the upper surface and the convex regions. The light emitted from the upper surface is refracted at a first angle with respect to the upper surface, the light emitted from the convex regions is refracted at a second angle with respect to the upper surface, and the first angle is different from the second angle.

In certain embodiments, the substantially flat upper surface is substantially square-shaped as viewed in plan view. The lens may further comprise protrusions extending outward from each vertex of the substantially square-shaped upper surface in the plane of the upper surface.

In certain embodiments, the upper surface is substantially circular-shaped as viewed in plan view.

In certain embodiments, an upper surface of the recess is convex shaped.

BRIEF DESCRIPTION OF THE DRAWINGS

Exemplary embodiments of the disclosure will be more clearly understood from the following detailed description taken in conjunction with the accompanying drawings.

DETAILED DESCRIPTION OF THE EMBODIMENTS

Figure 1A:
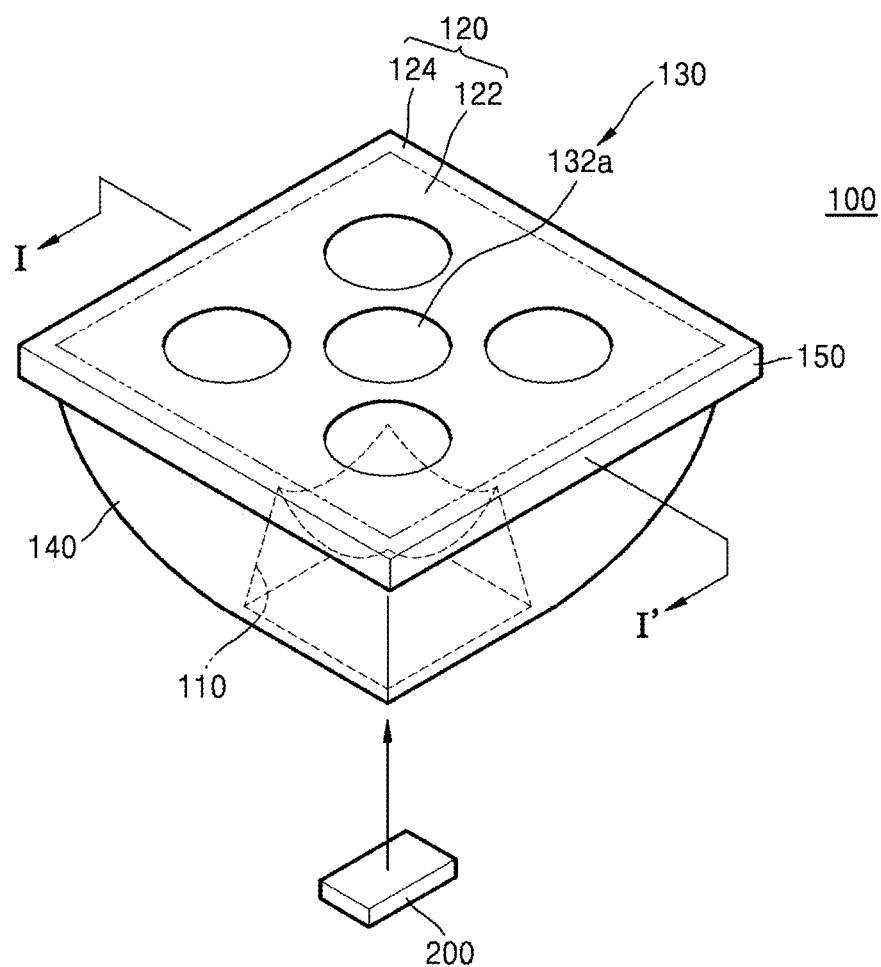
FIGS. 1A and 1B are, respectively, a perspective view and a plan view illustrating a lens for controlling an illuminance distribution, according to an exemplary embodiment of the disclosure.

The disclosure will now be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the disclosure to those skilled in the art.

It will be understood that when an element, such as a layer, a region, or a substrate, is referred to as being "on", "connected to", or "coupled to" another element, it may be directly on, connected or coupled to the other element or intervening elements may be present. In contrast, when an element is referred to as being "directly on", "directly connected to", or "directly coupled to" another element or layer, there are no intervening elements or layers present. In the drawings, the structures or sizes of elements are exaggerated for descriptive convenience and clarity, and parts that are not related to the descriptions will be omitted. Like reference numerals in the drawings denote like elements. The terminology used herein is for the purpose of describing particular embodiments only and is not intended to be limiting of exemplary embodiments.

Figure 1B:
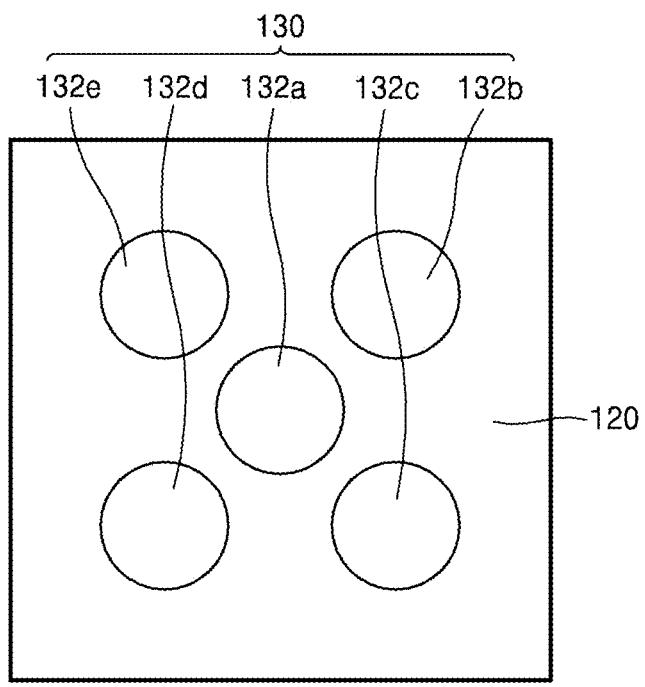
Figure 1C:
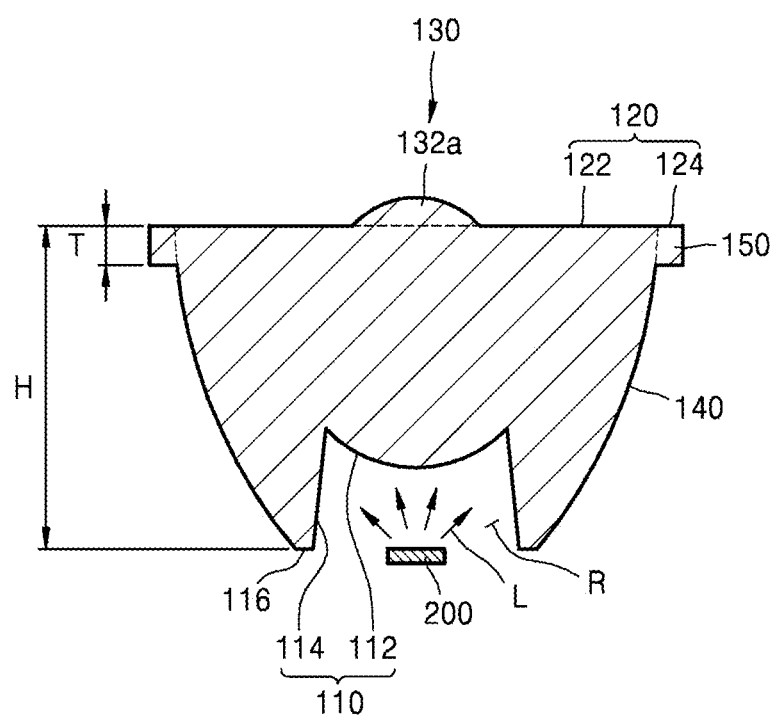
FIG. 1C is a cross-sectional view taken along line I-I' of FIG. 1A.

FIGS. 1A and 1B are, respectively, a perspective view and a plan view illustrating a lens 100 for controlling an illuminance distribution, according to an exemplary embodiment of the disclosure. FIG. 1C is a cross-sectional view taken along line I-I' of FIG. 1A.

Referring to FIGS. 1A through 1C, the lens 100 according to the present exemplary embodiment includes an incidence surface 110, an emission surface 120, an illuminance controller 130, an outer surface 140, and a protrusion 150.

The incidence surface 110 may refer to an optical surface through which light L emitted from a light-emitting device 200, e.g., a light-emitting diode (LED), is incident onto the lens 100. In the present exemplary embodiment, the incidence surface 110 may be formed as a recess R that is dented upwards, i.e., toward the emission surface 120, from a lower surface 116. Therefore, the incidence surface 110 includes a refractive surface 112 that constitutes a bottom of the recess R and an inner surface 114 that extends downwards from the refractive surface 112 to constitute a side of the recess R.

As shown in FIG. 1C, the refractive surface 112 may have a shape that is convex toward the light-emitting device 200. For example, the refractive surface 112 may be formed in a hemispherical lens structure having a predetermined radius of curvature. The refractive surface 112 may be formed as an aspherical surface. The refractive surface 112 concentrates the light L emitted from the light-emitting device 200 onto the emission surface 120. Through this, the emitted light L may be controlled to be concentrated on an illumination surface. Here, the illumination surface may refer to an area to which the light L emitted from the light-emitting device 200 is to be irradiated, such as a viewing angle of a camera.

The inner surface 114 is inclined at a predetermined angle with respect to the lower surface 116 so that a horizontal section of the recess R widens toward the lower surface 116. The light L emitted from a side of the light-emitting device 200 is incident onto and refracted from the inner surface 114. Since the inner surface 114 is inclined, the incident and refracted light L may have a slightly smaller angle with respect to the outer surface 140. Therefore, a total reflection occurs on the outer surface 140 to allow the light L to go toward the emission surface 120.

The lower surface 116 may have a surface that encloses the recess R and is substantially parallel with the emission surface 120. If the light-emitting device 200 is disposed at a predetermined distance from the lower surface 116 to allow the light L to be incident onto the lower surface 116, the lower surface 116 may constitute a part of the incidence surface 110. In certain embodiments, the lower surface 116 may not exist. For example, if the recess R is formed so that the outer surface 140 immediately meets the inner surface 114, the lower surface 116 may not exist.

As shown in FIG. 1C, in certain embodiments, the lens 100 is substantially parabolic-shaped when viewed in cross section. The emission surface 120 may refer to an optical surface that emits the light L incident onto the lens 100. In the lens 100 of the present exemplary embodiment, the emission surface 120 may have a substantially square plane shape. The emission surface 120 is not limited to the square plane shape in the lens 100. For example, the emission surface 120 may have a substantially circular plane shape, a substantially elliptical plane shape, or a polygonal plane shape, such as, a pentagonal plane shape, or a hexagonal plane shape. The emission surface 120 is not limited to a plane shape and may have a curved surface structure.

The emission surface 120 includes first and second surfaces 122 and 124. The first surface 122 may be a surface that corresponds to the illumination surface and is formed by extending from the outer surface 140 if the protrusion 150 does not exist. The second surface 124 may be an upper surface of the protrusion 150 and form the same plane with the first surface 122 to constitute a part of the emission surface 120. In certain embodiments, the outer surface 140 may be a curved surface connecting the emission surface 120 and the recess R.

In certain embodiments, the illuminance controller 130 includes a plurality of convex regions, for example, five small lenses 132a, 132b, 132c, 132d, and 132e (hereinafter referred to as 132). The small lenses 132 may be formed in a spherical or aspherical shape to be convex or concave with respect to the emission surface 120. In the lens 100 of the present exemplary embodiment, the small lenses 132 have a spherical or aspherical shape that is convex with respect to the emission surface 120.

In more detail, the first small lens 132a has a convex spherical shape and is disposed at a center region with respect to the emission surface 120 having a square shape. The second through fifth small lenses 132b to 132e are respectively formed in convex spherical shapes in regions between the first small lens 132a and four vertexes.

The five small lenses 132 constituting the illuminance controller 130 disperse or concentrate light emitted from the emission surface 120 to control an illuminance distribution in the illumination surface. As described above, the illuminance controller 130 may be formed on the emission surface 120 to control and optimize the illuminance distribution in the illumination surface, thereby improving the luminous flux efficiency of the light-emitting device 200. Here, the luminous flux efficiency refers to a ratio of a luminous flux reaching the illumination surface to an output luminous flux of the light-emitting device 200.

The outer surface 140 constitutes an outer part of the lens 100 along with the incidence surface 110 and the emission surface 120 and connects the incidence surface 110 and the emission surface 120 to each other. To be more exact, the lower surface 116 and the protrusion 150 are a part of the lens 100 of the present exemplary embodiment 100. Therefore, the incidence surface 110 and the emission surface 120 may be connected to each other through the outer surface 140, the protrusion 150, and the lower surface 116. The outer surface 140 totally reflects light incident onto the lens 100 toward the emission surface 120.

The protrusion 150 is formed at an upper part of the outer surface 140 and protrudes from the outer surface 140 in an outwards horizontal direction. As described above, the upper surface of the protrusion 150 may be the second surface 124 that constitutes a part of the emission surface 120.

A thickness T of the protrusion 150 may be 0.2 mm or more. However, the thickness T of the protrusion 150 is not limited thereto. For example, the thickness T of the protrusion 150 may be 0.3 mm in the lens 100 of the present exemplary embodiment.

The protrusion 150 may be combined with an external support member (not shown) to fix the lens 100 to the external support member. Therefore, the thickness T of the protrusion 150 may be enough to stably fix the lens 100 to the external support member. The protrusion 150 and the external support member will be described in more detail later with reference to FIGS. 10A through 12.

A height H of the lens 100 may be about 2 mm. For example, the height H of the lens 100 may be about 2.09 mm. The height H of the lens 100 is not limited to the above-mentioned numerical value. The lens 100 may be formed of silicone. The lens 100 may be formed into a single body along with the illuminance controller 130 and the protrusion 150 by using a mold manufactured in consideration of the illuminance controller 130 and the protrusion 150.

In the lens 100 of the present exemplary embodiment, a small lens for controlling an illuminance distribution is formed on the emission surface 120, and thus the illuminance distribution is controlled and optimized on the illumination surface to thereby improve the luminous flux efficiency of the light-emitting device 200.

Figure 2A:
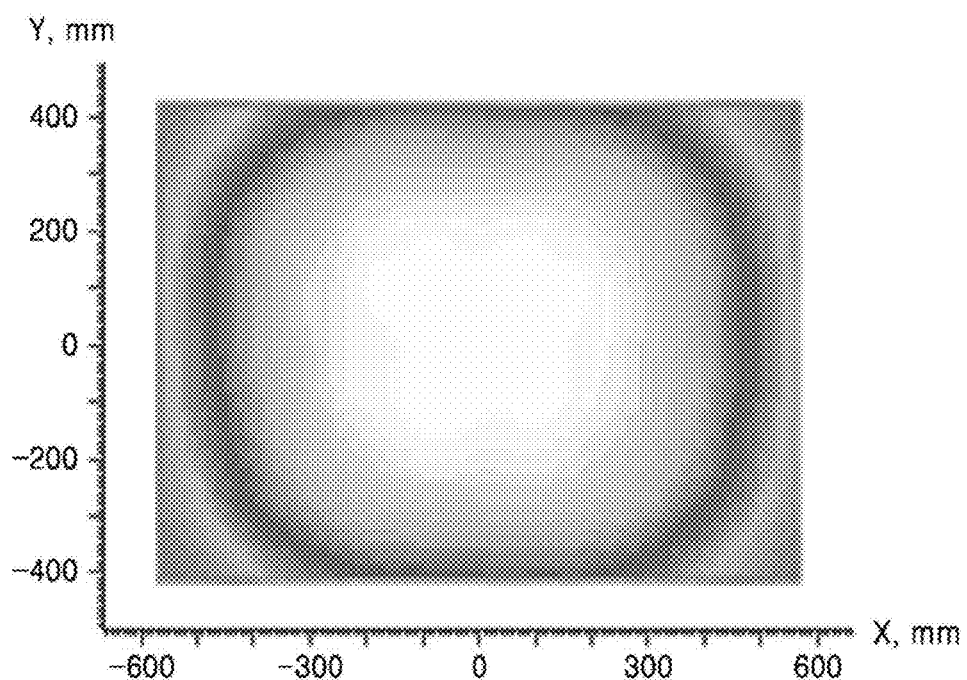
FIGS. 2A and 2B are, respectively, graphs illustrating an illuminance distribution controlled by a lens having an emission surface on which an illuminance controller is not formed and an illuminance distribution on an illumination surface controlled by the lens of FIG. 1A.
Figure 2B:
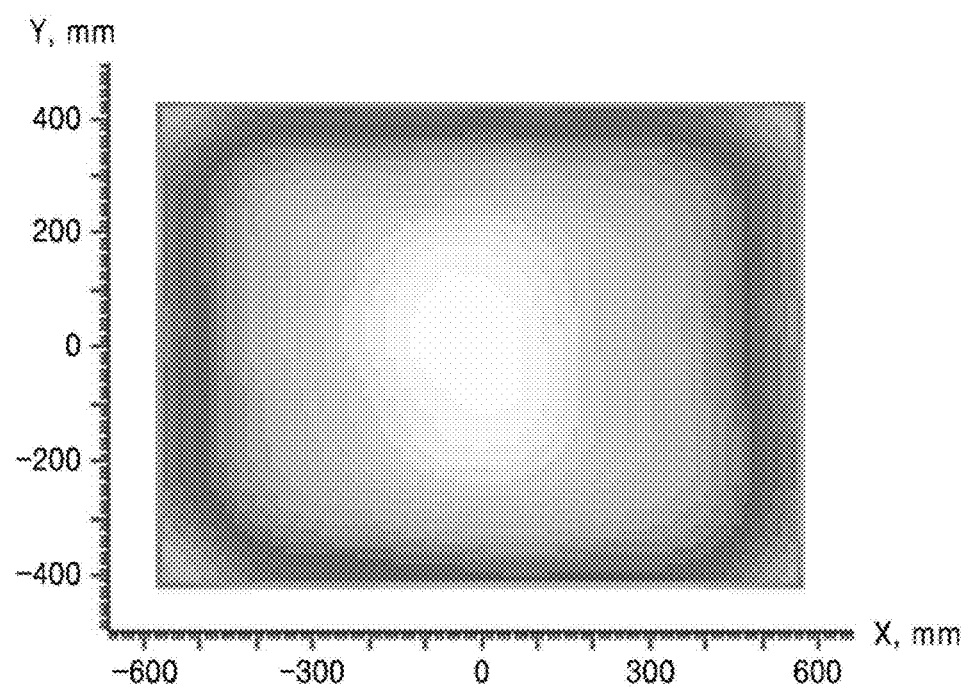

FIGS. 2A and 2B are respectively graphs illustrating an illuminance distribution controlled by a lens having an emission surface on which an illuminance controller is not formed and an illuminance distribution on an illumination surface controlled by the lens 100 of FIG. 1A.

Referring to FIG. 2A, in the lens in which the illuminance controller is not formed, an illuminance is very weak at an outer part on an illumination surface, in particular, at a square vertex part. Due to the weak illuminance at the outer part on the illumination surface, an illuminance distribution does not agree with the illumination surface having a square shape and is more circular-shaped.

Referring to FIG. 2B, in the lens 100 of FIG. 1A, the five small lenses 132 are arranged as an illuminance controller on the emission surface 120, and thus light goes toward an outer part of the illumination surface. Therefore, an illuminance is secured to some degree at the outer part of the illumination surface, in particular, at a square vertex part. Therefore, the lens 100 of the present exemplary embodiment improves the illuminance at the square vertex part and the outer part of the illumination surface to spread the illuminance distribution to further outside and optimizes the illuminance distribution on the illumination surface having a square shape.

For reference, the light-emitting device 200 may be generally manufactured in a square chip shape in consideration of yield. Therefore, the illuminance distribution may be made square on the illumination surface to correspond to the square chip shape, thereby improving luminous flux efficiency. The square illuminance distribution has been exemplarily described in the present exemplary embodiment. However, a small lens or a prism may be appropriately arranged on an emission surface of a lens to optimize the illuminance distribution in a particular shape.

Figure 3:
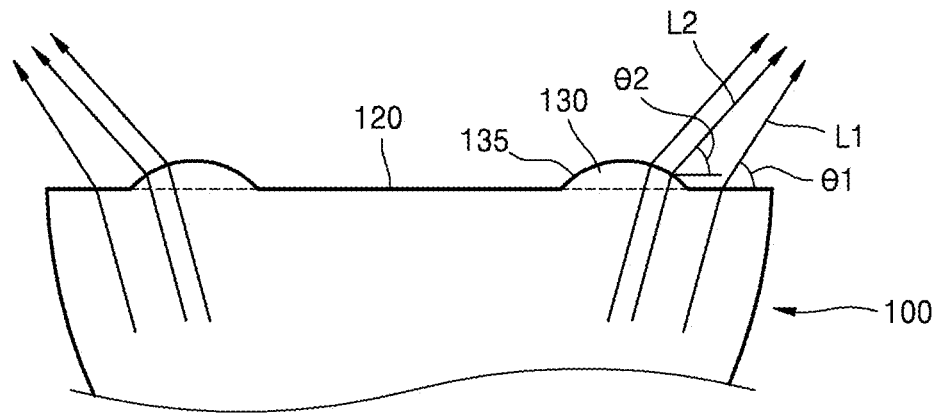
FIG. 3 is a view illustrating a principle of distributing light outwards from the lens of FIG. 1A.

FIG. 3 is a view illustrating a principle of distributing light outwards from the lens 100 of FIG. 1A.

Referring to FIG. 3, if the small lens 132 is formed in a convex spherical shape having a predetermined curvature, refraction angles of light beams advancing in parallel with one another may be different according to whether the light beams are emitted through the emission surface 120 or through a surface 135 of the small lens 132. Therefore, directions of the light beams may be different.

In detail, a first light beam L1 emitted through the emission surface 120 is refracted at a first angle θ1 with respect to the emission surface 120. A second light beam L2 emitted through the surface 135 of the small lens 132 is refracted at a second angle θ2 with respect to the emission surface 120. The second angle θ2 may be smaller than the first angle θ1, and thus the second light beam L2 may advance more outwards than the first light beam L1. As described above, light beams emitted through the surface 135 of the small lens 132 advance more outwards and thus contribute to an improvement of an illuminance at an outer part. Therefore, an illuminance distribution is spread further outwards and is optimized on an illumination surface having a square shape.

Figure 4A:
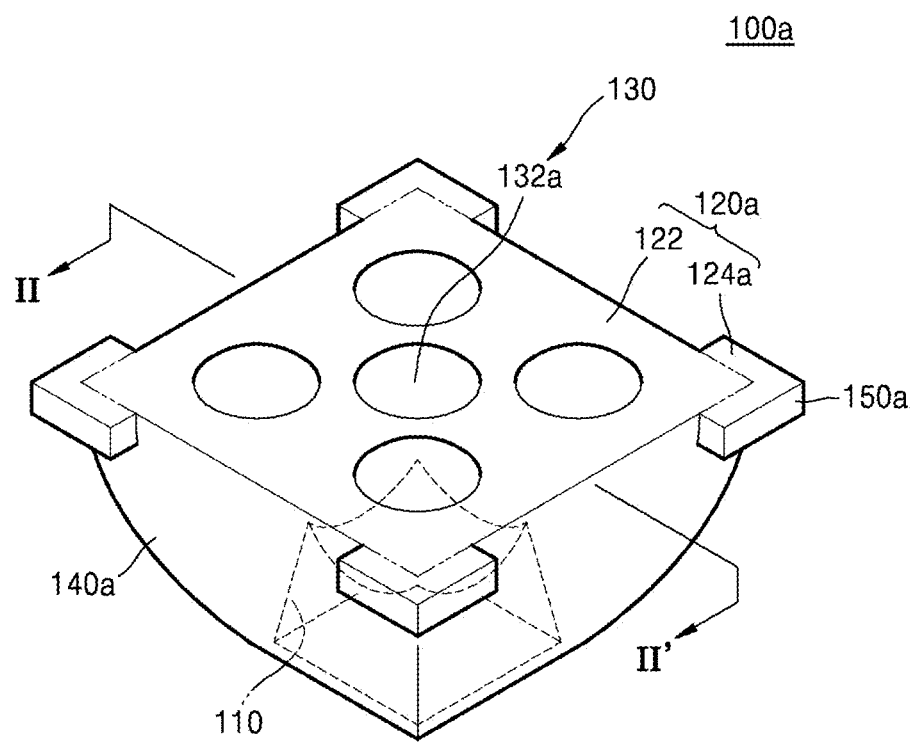
FIGS. 4A and 4B are, respectively, a perspective view and a plan view illustrating a lens for controlling an illuminance distribution, according to another exemplary embodiment of the disclosure.
Figure 4B:
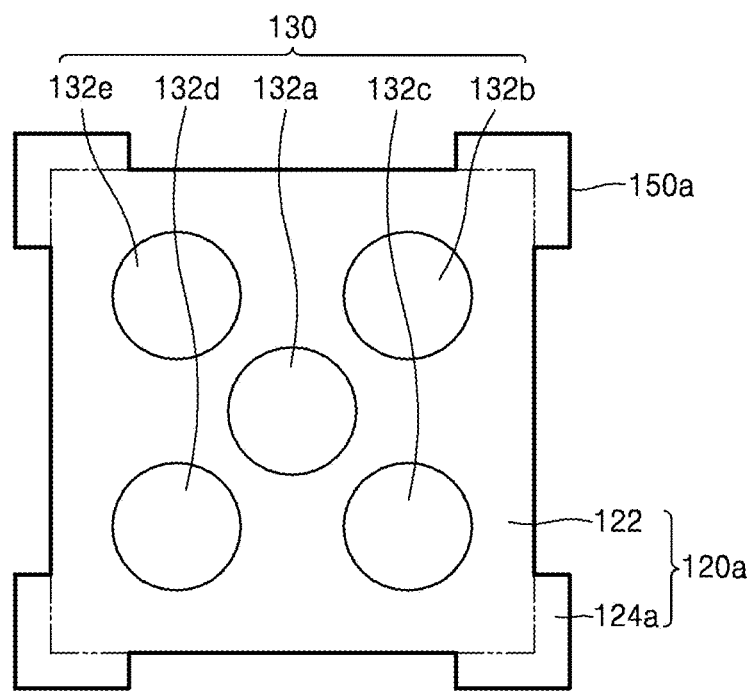
Figure 4C:
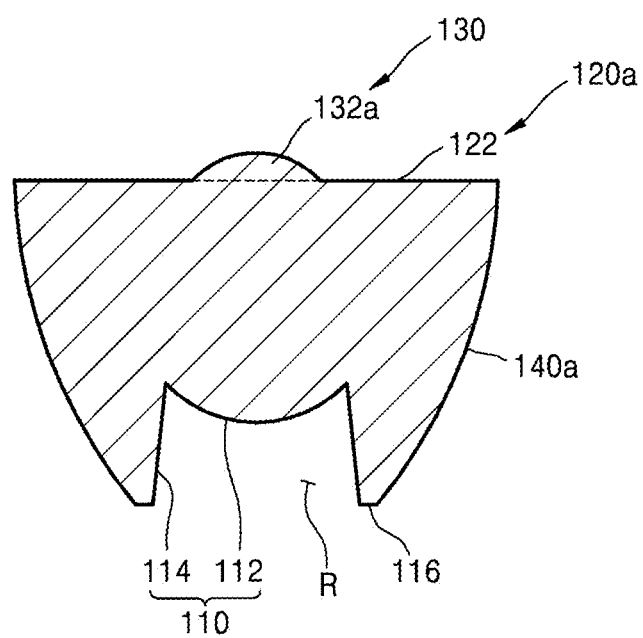
FIG. 4C is a cross-sectional view taken along line II-II' of FIG. 4A.

FIGS. 4A and 4B are respectively a perspective view and a plan view illustrating a lens 100a for controlling an illuminance distribution, according to another exemplary embodiment of the disclosure. FIG. 4C is a cross-sectional view taken along line II-II' of FIG. 4A.

For convenience of description, the same contents of FIGS. 4A through 4C as those described with reference to FIGS. 1A through 1C will be described in brief or will be omitted.

Referring to FIGS. 4A through 4C, the lens 100a according to the present exemplary embodiment is similar to the lens 100 of FIG. 1A except for protrusions 150a. In the lens 100a of the present exemplary embodiment, the protrusions 150a are adjacent to four square vertexes of a first surface 122 and are not formed in regions along four sides between the four square vertexes of the first surface 122.

An emission surface 120a includes the first surface 122 and second surfaces 124a. The first surface 122 may be the same as the first surface 122 of the emission surface 120 of the lens 100 of FIG. 1A. Therefore, the first surface 122 may be directly connected to an outer surface 140a. The second surfaces 124a may be upper surfaces of the protrusions 150a.

In the lens 100a of the present exemplary embodiment, the protrusions 150a are formed at the four square vertexes of the first surface 122. Therefore, a light loss is reduced through the protrusions 150a, and thus luminous flux efficiency is improved.

Even in the lens 100a of the present exemplary embodiment, five small lenses 132 are formed on the emission surface 120a to control and optimize an illuminance distribution on an illumination surface and improve the luminance flux efficiency of a light-emitting device.

Figure 5A:
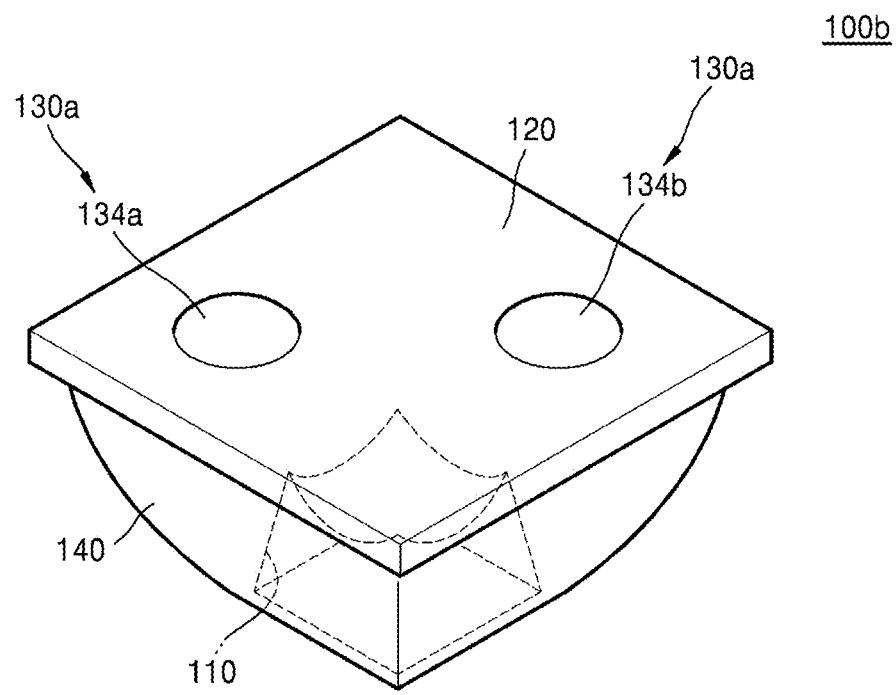
FIGS. 5A and 5B are, respectively, a perspective view and a plan view illustrating a lens for controlling an illuminance distribution, according to another exemplary embodiment of the disclosure.
Figure 5B:
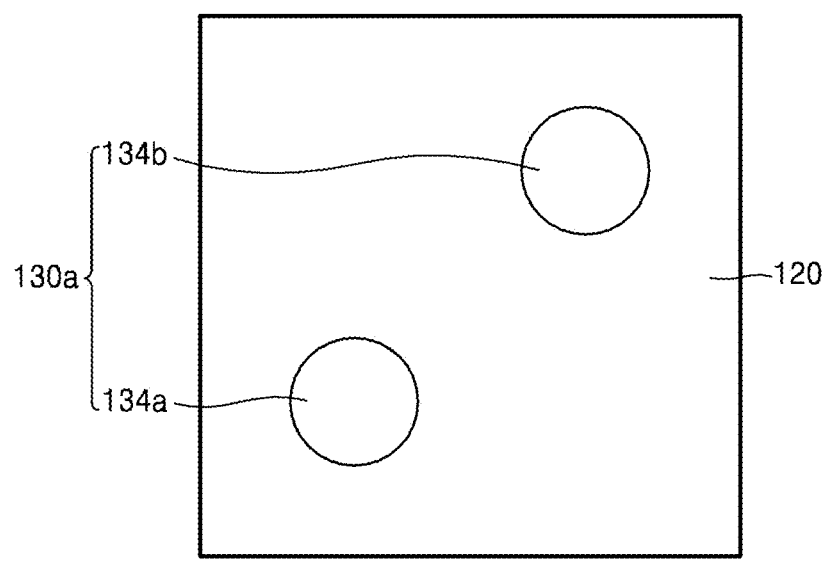

FIGS. 5A and 5B are respectively a perspective view and a plan view illustrating a lens 100b for controlling an illuminance distribution, according to another exemplary embodiment of the disclosure. For convenience of description, the same contents of FIGS. 5A and 5B as those described with reference to FIGS. 1A through 1C will be described in brief or will be omitted.

Referring to FIGS. 5A and 5B, the lens 100b of the present exemplary embodiment is similar to the lens 100 of FIG. 1A except for an illuminance controller 130a. In the lens 100b of the present exemplary embodiment, the illuminance controller 130a includes two small lenses 134a and 134b. The small lenses 134a and 134b may be formed in spherical or aspherical shapes that are convex or concave with respect to an emission surface 120. For example, the small lenses 134a and 134b may have spherical or aspherical shapes that are convex upwards with respect to the emission surface 120.

In more detail, the first small lens 134a may be formed in a convex spherical shape in a region between a center of the emission surface 120 having a square shape and a left lower vertex. The second small lens 134b may be formed in a convex spherical shape in a region between the center of the emission surface 120 and a right upper vertex. The first and second small lenses 134a and 134b may be arranged on a diagonal line that connects the left lower vertex and the right upper vertex to each other. Alternatively, the first and second small lenses 134a and 134b may be arranged on another diagonal line that connects a left upper vertex and a right lower vertex to each other.

In the lens 100b of the present exemplary embodiment, two small lenses are arranged on the emission surface 120 to be respectively adjacent to two square vertexes corresponding to diagonal lines. Therefore, illuminance may be improved at the corresponding vertexes, and an illuminance distribution may be controlled on an illumination surface to realize a desired illuminance distribution and improve luminous flux efficiency.

Figure 6A:
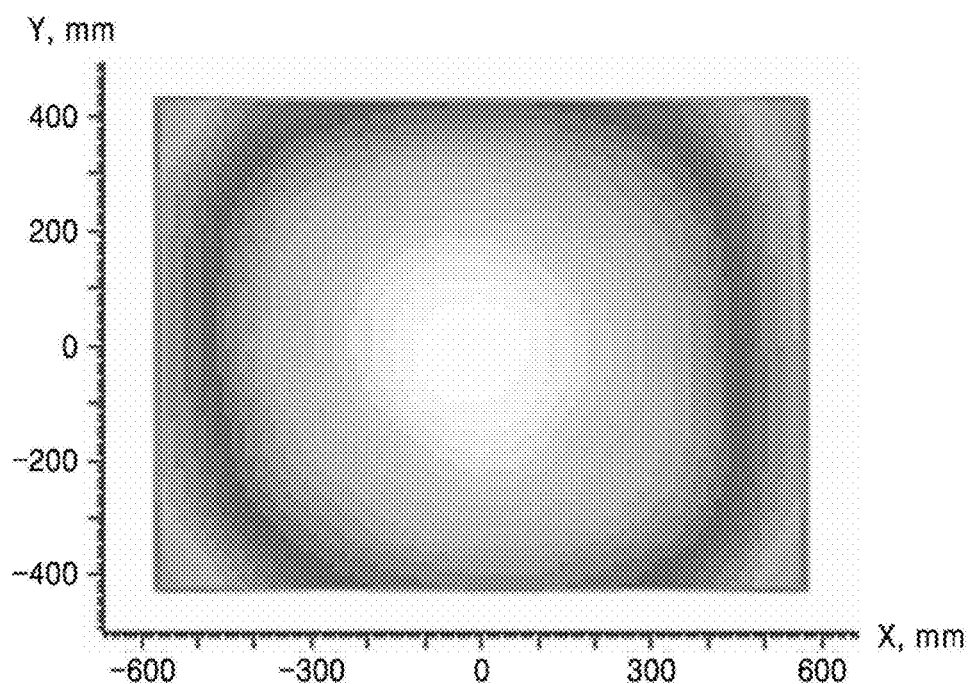
FIGS. 6A and 6B are, respectively, graphs illustrating an illuminance distribution on a lens having an emission surface on which an illuminance controller is not formed and an illuminance distribution on an illumination surface controlled by the lens of FIG. 5A.
Figure 6B:
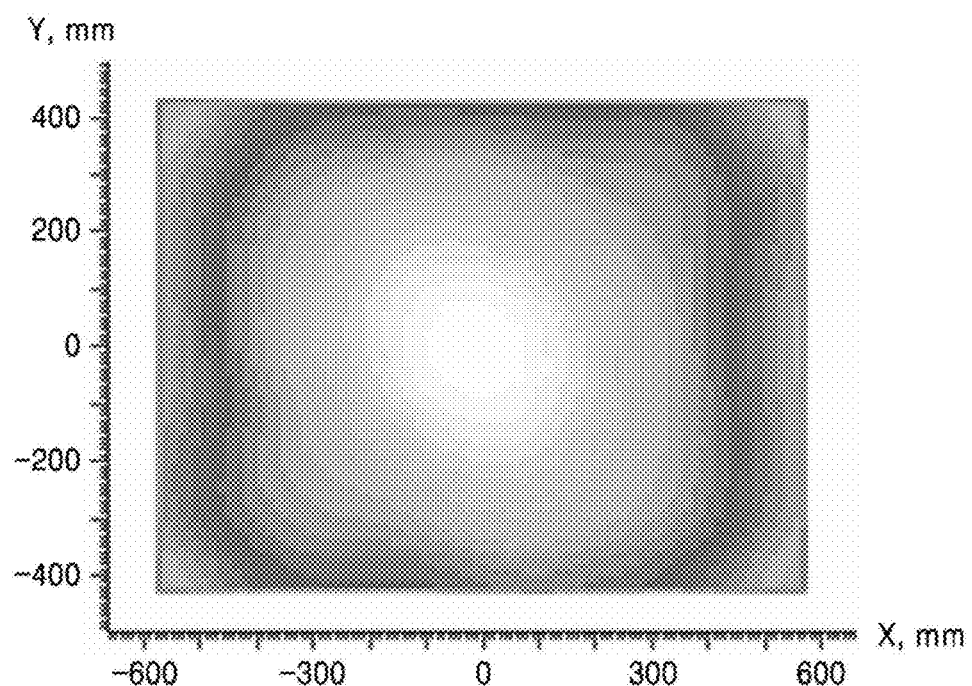

FIGS. 6A and 6B are respectively graphs illustrating an illuminance distribution controlled by a lens having an emission surface on which an illuminance controller is not formed and an illuminance distribution on an illumination surface controlled by the lens 100b of FIG. 5A.

Referring to FIG. 6A, in the lens on which the illuminance controller is not formed, a left lower region and a right upper region on an illumination surface have relatively lower illuminances than the other two vertex regions.

In the lens 100b of FIG. 5A, the two small lenses 134a and 134b are arranged at a left lower region and a right upper region to allow light to advance toward the left lower region and the right upper region. Therefore, illuminance at the left lower region and the right upper region on the illumination surface may be improved to control an illuminance distribution so that the illuminance distribution is spread more toward an outer vertex.

The above-described features will now be summarized. Like a lens for controlling an illuminance distribution as described with reference to FIG. 1A, 4A, or 5A, an emission surface formed at a top of the lens may be divided into appropriately arranged small lenses or prisms. Therefore, an advancing direction of light may be controlled to control an illuminance distribution on a target illumination surface, thereby improving luminous flux efficiency and tolerance and realizing an illuminance distribution appropriate for a particular shape. Here, the tolerance is improved so that a performance difference is not great due to a misalignment between the light-emitting device and the lens. The number of small lenses or prisms is not limited to the number exemplified in FIG. 1A, 4A, or 5A. For example, the number of small lenses or prisms may be variously determined to realize a desired illuminance distribution.

Figure 7A:
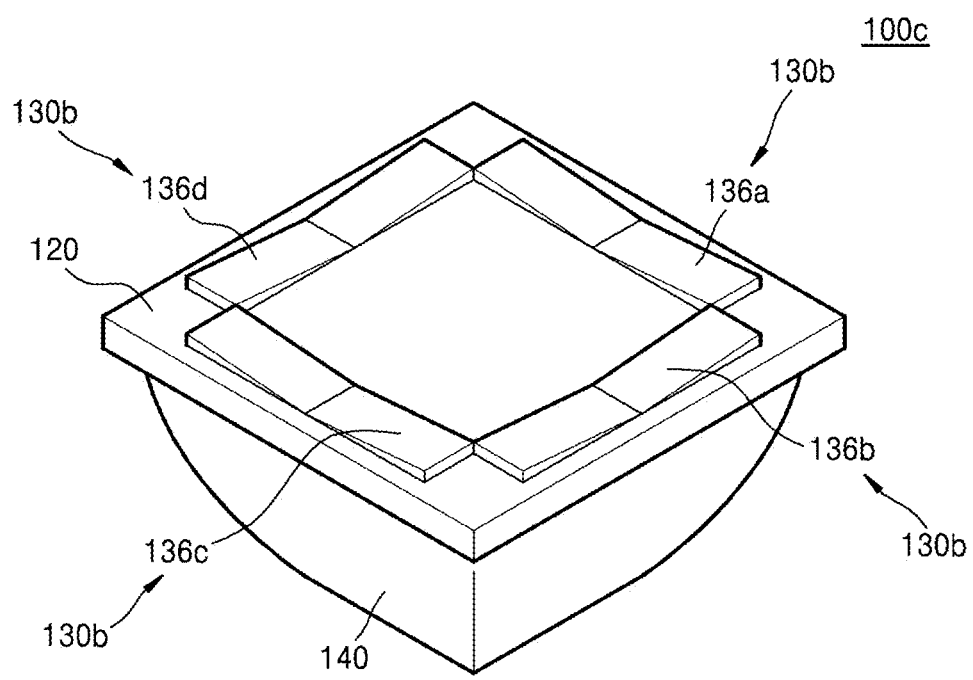
FIG. 7A is a perspective view illustrating a lens for controlling an illuminance distribution, according to another exemplary embodiment of the disclosure.
Figure 7B:
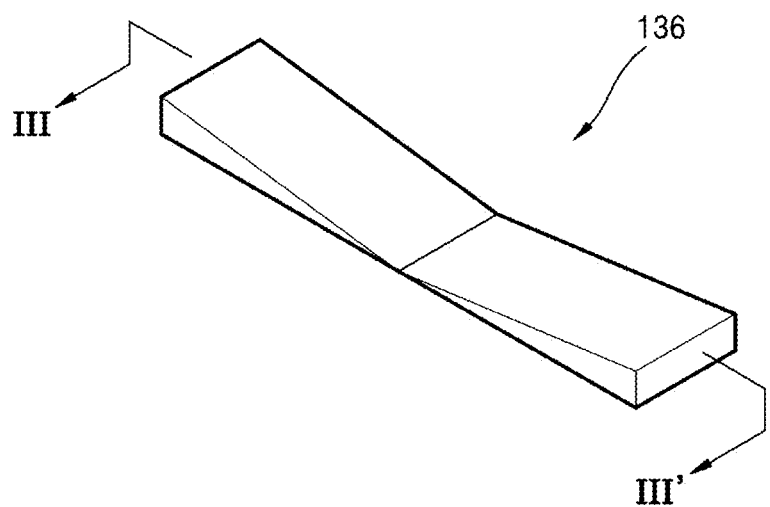
FIG. 7B is an enlarged view of a small prism of the lens of FIG. 7A.
Figure 7C:
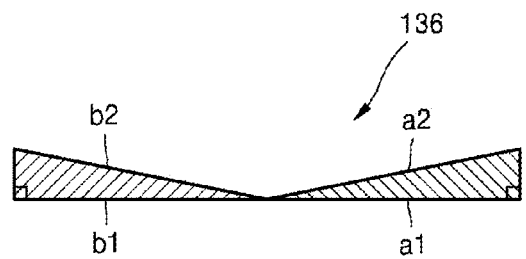
FIG. 7C is a cross-sectional view taken along line III-III' of FIG. 7B.

FIG. 7A is a perspective view illustrating a lens 100c for controlling an illuminance distribution, according to another exemplary embodiment of the disclosure. FIG. 7B is an enlarged view of a small prism of the lens 100c of FIG. 7A. FIG. 7C is a cross-sectional view taken along line III-III' of FIG. 7B.

For convenience of description, the same features of FIGS. 7A through 7C as those described with reference to FIGS. 1A through 1C will be described in brief or will be omitted.

Referring to FIGS. 7A through 7C, the lens 100c of the present exemplary embodiment is similar to the lens 100 of FIG. 1 except for an illuminance controller 130b. In the lens 100c of the present exemplary embodiment, the illuminance controller 130b includes four small prisms 136a, 136b, 136c, and 136d (hereinafter referred to as 136) that are arranged at rectangular sides.

The four small prisms 136 have rectangular bottoms that extend along sides of an emission surface 120. Also, the four small prisms 136 have structures that decrease in height toward their centers and increase in height toward the outside. Therefore, a section of each of the four small prisms 136 may have a shape in which two right triangles are connected to each other in an M shape. In other words, the section of each of the four small prisms 136 may have a structure in which a vertex at which a base side a1 and a hypotenuse a2 of a right triangle meet each other is connected to a vertex at which a base side b1 and a hypotenuse b2 of a left triangle meet each other.

Figure 8:
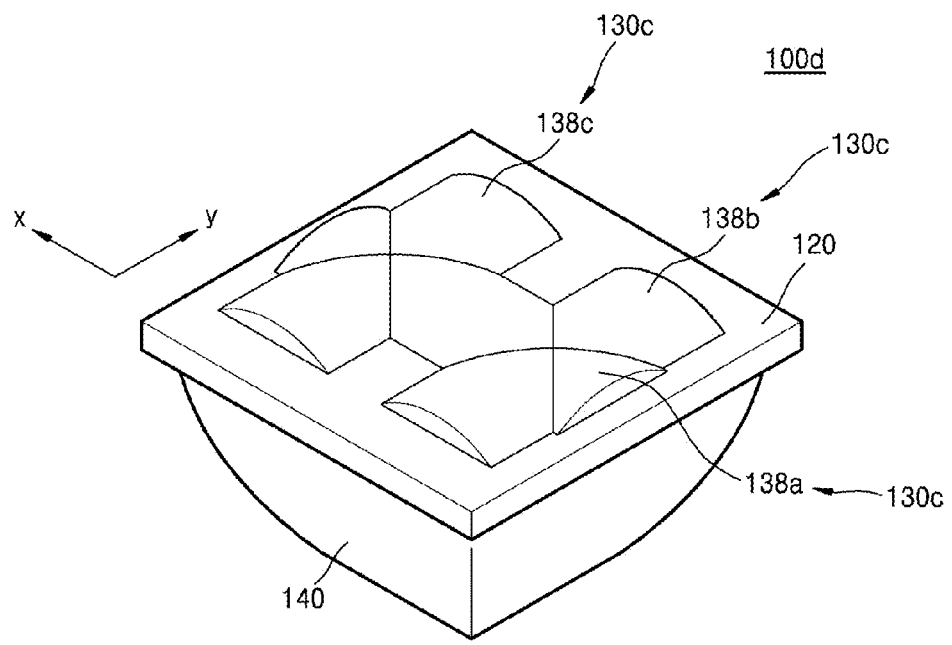
FIG. 8 is a perspective view illustrating a lens for controlling an illuminance distribution, according to another exemplary embodiment of the disclosure.

FIG. 8 is a perspective view illustrating a lens 100d for controlling an illuminance distribution, according to another exemplary embodiment of the disclosure. For convenience of description, the same features of FIG. 8 as those described with reference to FIGS. 1A through 1C will be described in brief or will be omitted. Referring to FIG. 8, the lens 100d of the present exemplary embodiment is similar to the lens 100 of FIG. 1A except for an illuminance controller 130c. In the lens 100d of the present exemplary embodiment, the illuminance controller 130c is formed in a structure in which lenses 138a, 138b, and 138c (hereinafter referred to as 138) having semicircular pillar structures intersect with one another. In detail, the illuminance controller 130c may be formed in a structure in which the first small lens 138a having a semicircular pillar structure extending in an x-axis direction intersects with the second and third small lenses 138b and 138c having semicircular pillar structures extending a y-axis direction.

The number of small lenses 138 of the illuminance controller 130c and extending directions of the small lenses 138 may be different according to a desired illuminance distribution on an illumination surface. For example, the illuminance controller 130c may be formed so that two small lenses 138 are formed in the x-axis direction to intersect with three small lenses 138 formed in the y-axis direction. In the illuminance controller 130c, two rectangular small lenses 138 are formed to extend in diagonal directions and intersect with each other.

Figure 9:
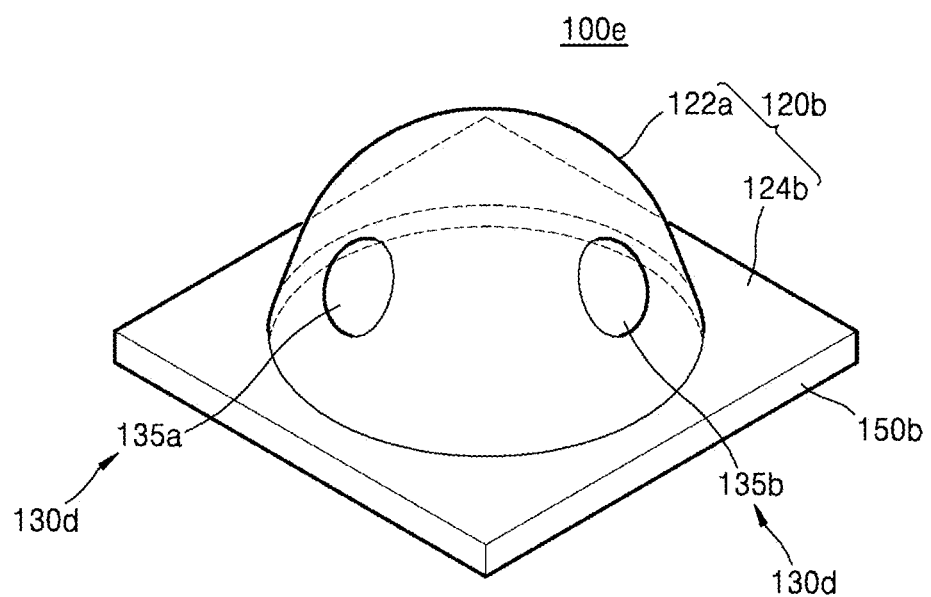
FIG. 9 is a perspective view illustrating a lens for controlling an illuminance distribution, according to another exemplary embodiment of the disclosure.

FIG. 9 is a perspective view illustrating a lens 100e for controlling an illuminance distribution, according to an exemplary embodiment of the disclosure.

Referring to FIG. 9, the lens 100e of the present exemplary embodiment is different from the lens 100 of FIG. 1A in that an emission surface 120b is formed as a curved surface. In detail, the emission surface 120b includes first and second surfaces 122a and 124b. The first surface 122a may be a surface that has a hemispherical shape and emits most of the light. The second surface 124b may be an upper surface of a protrusion 150b that protrudes from an edge of the first surface 122a in an outward horizontal direction. In certain embodiments, the second surface 124b may not emit light according to an arrangement position of a light-emitting device.

An illuminance controller 130d may be formed along an edge of the first surface 122a of the emission surface 120b. The illuminance controller 130d includes a plurality of small lenses 135a and 135b (hereinafter referred to as 135). The small lenses 135a and 135b may be formed in spherical or aspherical shapes that are convex or concave with respect to the first surface 122a of the emission surface 120b. Four or more small lenses 135 may be formed along the edge of the first surface 122a of the emission surface 120b.

In the lens 100e of the present exemplary embodiment, the plurality of small lenses 135 are arranged on the emission surface 120b to control an illuminance distribution on an illumination surface. Therefore, the illuminance distribution on the illumination surface is optimized, and luminous flux efficiency is improved.

Figure 10A:
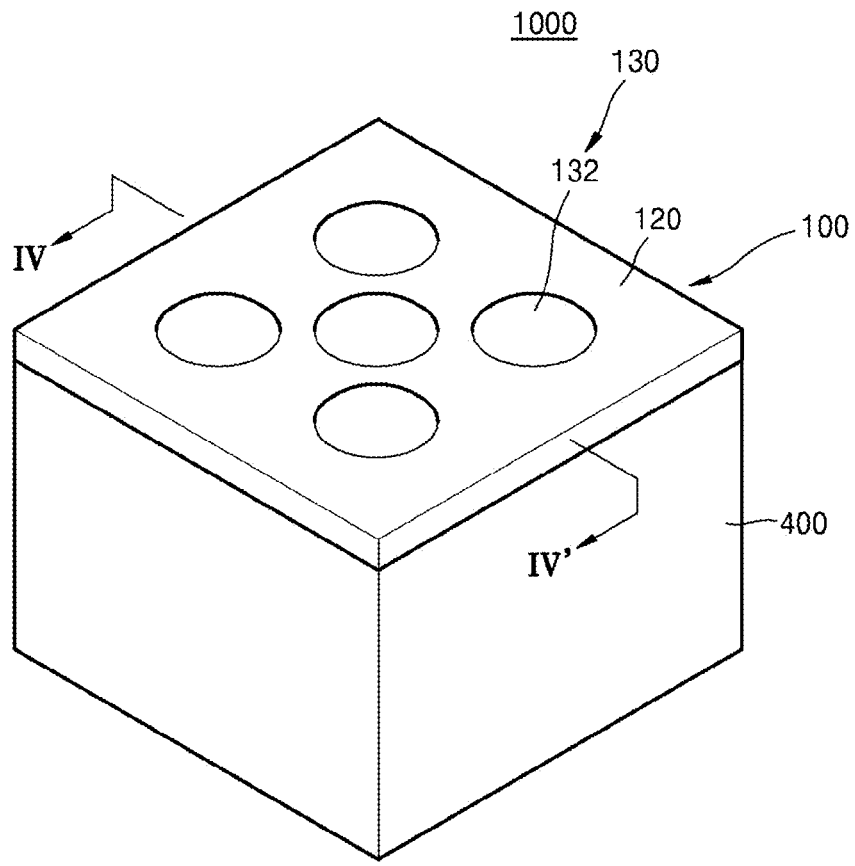
FIG. 10A is a perspective view illustrating a light-emitting diode (LED) package according to an exemplary embodiment of the disclosure.
Figure 10B:
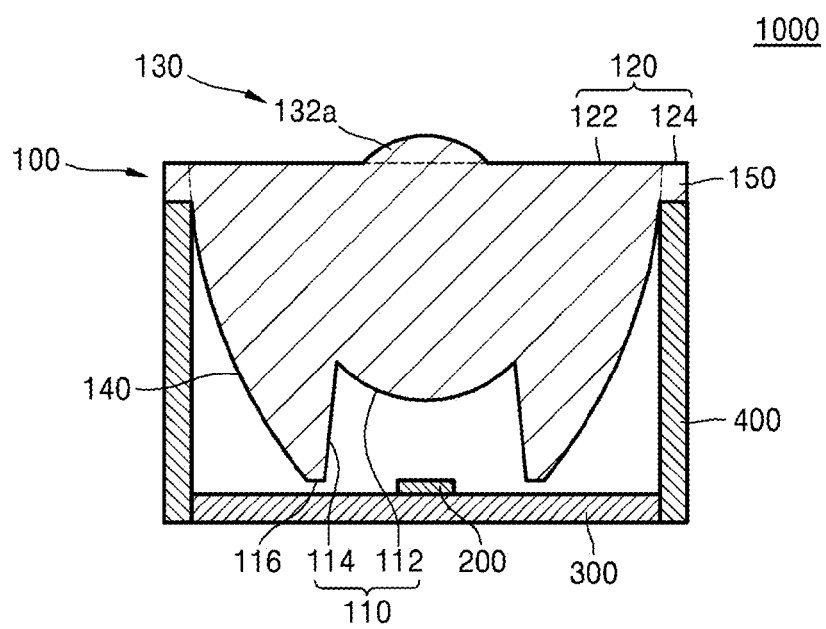
FIG. 10B is a cross-sectional view taken along line IV-IV' of FIG. 10A.

FIG. 10A is a perspective view illustrating a light-emitting diode (LED) package 1000 according to an exemplary embodiment of the disclosure. FIG. 10B is a cross-sectional view taken along line IV-IV' of FIG. 10A.

Referring to FIGS. 10A and 10B, the LED package 1000 includes a lens 100 for controlling an illuminance distribution, a light-emitting device chip 200, a printed circuit board (PCB) 300, and a support member 400.

The lens 100 may be the lens 100 of FIG. 1A. Therefore, an illuminance controller 130 may be formed on an emission surface 120. The illuminance controller 130 may be five small lenses 132. The lens 100 has been described in detail with reference to FIG. 1, and thus a detailed description thereof is omitted herein. The LED package 1000 of the present exemplary embodiment may use one of lenses for controlling illuminance distributions as shown in FIGS. 4A, 5A, 7A, 8, and 9.

The light-emitting device chip 200 may be any type of chip that emits light. For example, the light-emitting device chip 200 may be an LED chip. The light-emitting device chip 200 may have a rectangular flat structure, however, the light-emitting device chip 200 is not limited to the rectangular flat structure. The light-emitting device chip 200, such as, a structure of an LED chip, is well known, and thus a detailed description thereof is omitted.

The PCB 300 is a support board on which the light-emitting device chip 200 is mounted and on which a plurality of circuit lines (not shown) may be formed. In detail, the PCB 300 supplies a current, for example, to the light-emitting device chip 200 through the circuit lines, and the light-emitting device chip 200 generates and emits light by using the supplied current.

The support member 400 supports and fixes the lens 100. The support member 400 may have a structure that encloses sides of the lens 100. The support member 400 is combined with the PCB 300. The support member 400 may not be combined with the PCB 300 but may be combined with a structure included in the LED package 100 to be constituted as a part of the structure. The support member 400 may be formed of plastic or a resin and may be transparent or opaque.

The lens 100 may adhered to the support member 400 through a protrusion 150 that combines with the support member 400. For example, as shown in FIGS. 10A and 10B, the protrusion 150 may adhere onto an edge of the support member 400 so that the lens 100 is fixed into the support member 400.

As described above, the protrusion 150 may be thick enough to allow the lens 100 to be fixed into the support member 400 with a predetermined mechanical strength. For example, if the protrusion 150 is not thick enough, and a shock is applied to the lens 100 from the outside of the LED package 1000, the protrusion 150 may be separated from the lens 100. Therefore, the lens 100 may be separated from the LED package 1000 or may be moved to an inappropriate position.

In the LED package 1000 of the present exemplary embodiment, a space inside the support member 400 may be filled with air. As shown in FIGS. 10A and 10B, a lower surface 116 of the lens 100 is spaced apart from the PCB 300 but it may also contact the PCB 300.

The LED package 1000 of the present exemplary embodiment uses the lens 100 including an illuminance controller 130 that is formed as a small lens or a prism on an emission surface 120, thereby easily controlling an illuminance distribution on an illumination surface. Also, the illuminance distribution on the illumination surface is optimized, and thus luminous flux efficiency is improved.

Figure 11:
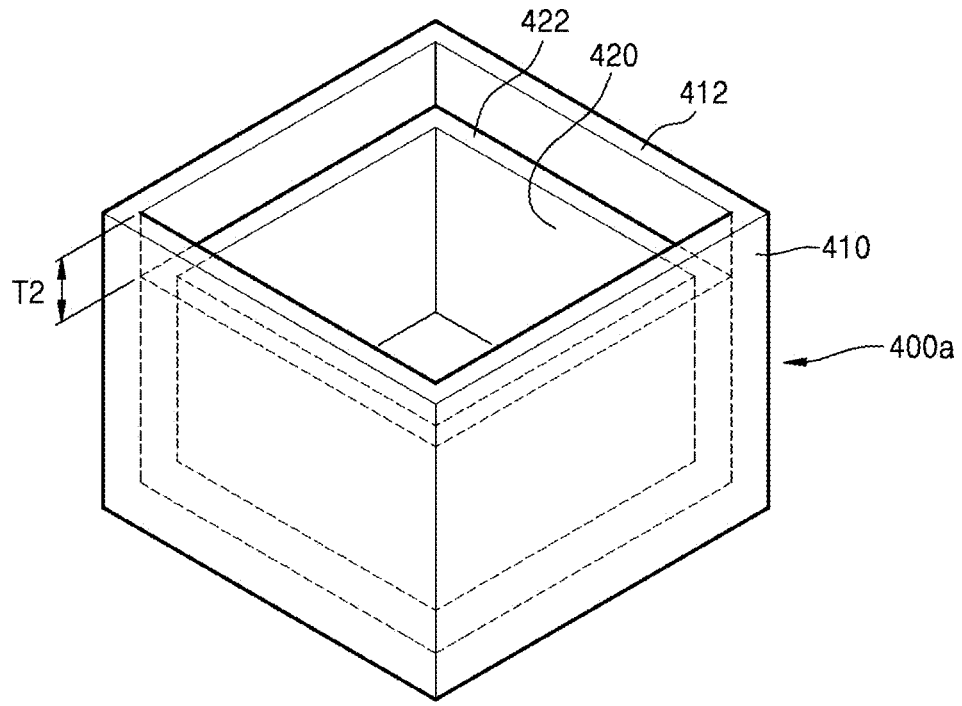
FIG. 11 is a perspective view illustrating a support member used in an LED package, according to an exemplary embodiment of the disclosure.

FIG. 11 is a perspective view illustrating a support member 400a that may be used in an LED package, according to an exemplary embodiment of the disclosure.

Referring to FIG. 11, a structure of the support member 400a of the present exemplary embodiment may be different from a structure of the support member 400 used in the LED package 1000 of FIG. 10A. An upper surface of an edge of the support member 400 used in the LED package 1000 is combined with the protrusion 150 of the lens 100. However, the support member 400a of the present exemplary embodiment may additionally include a support part 420 that is combined with the protrusion 150 of the lens 100 of FIG. 1A. The support member 400a may be combined with lenses as described with reference to FIGS. 4A, 5A, 7A, 8, and 9, besides the lens 100 of FIG. 1A.

In detail, the support member 400a includes a body part 410 and the support part 420. The body part 410 forms an entire frame of the support member 400a. For example, the body part 410 may have a rectangular parallelepiped structure, a horizontal section of which has a rectangular ring structure. Similarly to the body part 410, the support part 420 may have a rectangular parallelepiped structure, a horizontal section of which has a rectangular ring structure. However, as shown in FIG. 11, the support part 420 is formed inside the body part 410, and an outer surface of the support part 420 is combined with an inner surface of the body part 410 to form a single body.

An upper surface 422 of an edge of the support part 420 is lower than an upper surface 412 of an edge of the body part 410. Therefore, the lens 100 is combined with the support member 400a to be fully housed into the support member 400a. In other words, the protrusion 150 of the lens 100 is put on the upper surface 422 of the edge of the support part 420 to be combined with the support part 420. To fully house the lens 100 into the support member 400a, a difference T2 between heights of the upper surface 422 of the edge of the support part 420 and the upper surface 412 of the edge of the body part 410 may be higher than or equal to a thickness of the protrusion 150. Alternatively, the difference T2 may be lower than or equal to the thickness of the protrusion 150 in consideration of a shape of an illumination surface.

Figure 12:
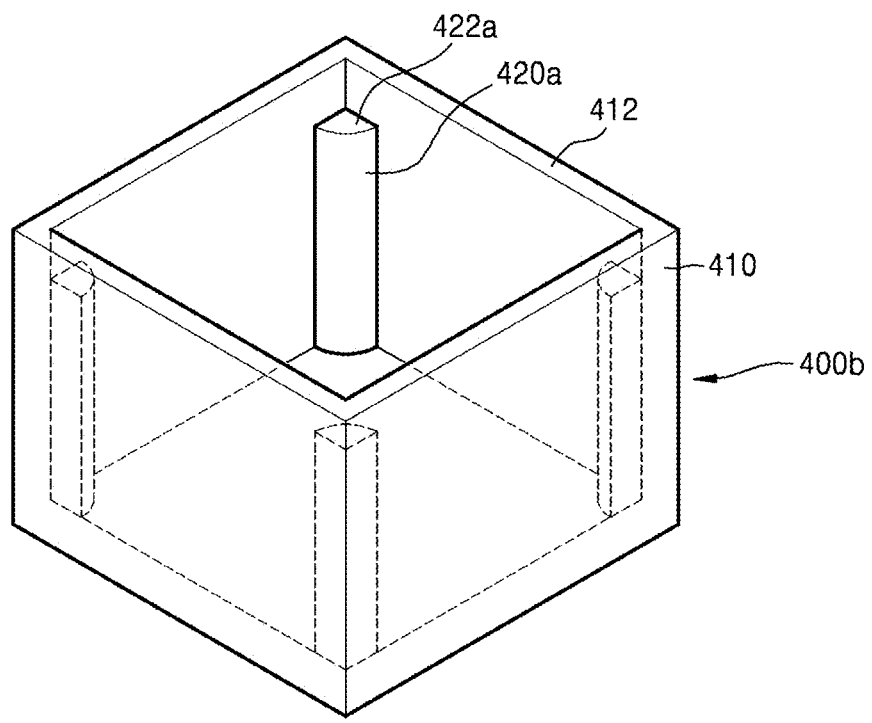
FIG. 12 is a perspective view illustrating a support member used in an LED package, according to another exemplary embodiment of the disclosure.

FIG. 12 is a perspective view illustrating a support member 400b that may be used in an LED package, according to another exemplary embodiment of the disclosure.

Referring to FIG. 12, similarly to the support member 400a of FIG. 11, the support member 400b of the present exemplary embodiment includes a body part 410 and support parts 420a. However, structures of the support parts 420a may be different from the structure of the support part 420 of the support member 400a of FIG. 11. In detail, the support parts 420a are formed in pillar shapes at four corners of the body part 410. Horizontal sections of the support parts 420a may have various shapes such as triangles, squares, quadrants, etc.

Like the upper surface 422 of the edge of the support part 420 of FIG. 11, upper surfaces 422a of the support parts 420a are lower than an upper surface 412 of an edge of the body part 410. Therefore, the lens 100 of FIG. 1A may be combined with the support member 400b to be fully housed inside the support member 400b. In other words, the protrusion 150 of the lens 100 may be positioned on the upper surfaces 422a of the support parts 420a to be engage with the support parts 420a. Since the support parts 420a are formed at the four corners of the body part 410, an illuminance distribution-controlling lens in which protrusions are formed at four vertex parts of the emission surface 120a like the lens 100a of FIG. 4A may be easily engaged with the support parts 420a. Also, lenses for controlling illuminance distributions as described with reference to FIGS. 5A, 7A, 8, and 9 may be combined with the support parts 420a.

While the disclosure has been particularly shown and described with reference to exemplary embodiments thereof, it will be understood that various changes in form and details may be made therein without departing from the spirit and scope of the following claims.

What is claimed is:

1. A lens for controlling an illuminance distribution, the lens comprising:
    an incidence surface onto which light emitted from a light-emitting device is incident;
    an emission surface through which the light incident onto the incidence surface is emitted;
    an illuminance controller, which comprises at least two optical devices, disposed on the emission surface to control an illuminance distribution of the emission surface;
    an outer surface that connects the incidence surface and the emission surface to each other and reflects the light incident onto the incidence surface toward the emission surface; and
    a protrusion that protrudes from an upper part of the outer surface in an outward horizontal direction and constitutes a part of the emission surface.

2. The lens of claim 1, wherein the emission surface is a substantially flat surface, and the optical devices are lenses having spherical or aspherical surfaces that are convex or concave with respect to the emission surface.

3. The lens of claim 1, wherein the emission surface is a substantially flat surface, and the optical devices are prisms having polygonal surfaces that are convex or concave with respect to the emission surface.

4. The lens of claim 1, wherein the emission surface has a hemispherical shape, and the lens further comprises a protrusion that protrudes from an edge of the emission surface in an outward horizontal direction.

5. The lens of claim 1, wherein the incidence surface is formed along a recess that is dented toward the emission surface and comprises a refractive surface that constitutes a bottom of the recess and is convex toward the light-emitting device; and
   an inner surface that is connected to the refractive surface to constitute a side of the recess.

6. The lens of claim 1, wherein the emission surface has a substantially square flat structure, and the illuminance controller comprises five lenses that are, respectively, disposed at a center region of the square flat structure and at four regions between a center and four vertexes of the substantially square flat structure.

7. The lens of claim 1, wherein the emission surface has a substantially square flat structure, and the illuminance controller comprises two lenses that are adjacent to two vertexes corresponding to a diagonal line across the substantially square flat structure.

8. The lens of claim 1, wherein the emission surface has a substantially square flat structure,
   wherein the illuminance controller comprises four prisms that are disposed along respective sides of the substantially square flat structure, and the prisms have substantially rectangular bottoms that extend along the sides of the substantially square flat structure, and sections taken along the sides have shapes in which each two right triangles are connected to each other in an M-shaped structure.

9. The lens of claim 1, wherein the emission surface has a substantially square flat structure, and the illuminance controller is a structure in which lenses having semicircular pillar structures intersect with one another.

10. A light-emitting diode (LED) package comprising:
    an LED chip;
    a printed circuit board (PCB) on which the LED chip is mounted;
    a support member that is combined with the PCB; and
    a lens, which controls an illuminance distribution, arranged above the LED chip, and comprises:
       an incidence surface onto which light emitted from the LED chip is incident;
       an emission surface that emits the light incident onto the incidence surface;
       an illuminance controller that comprises at least two optical devices formed on the emission surface to control an illuminance distribution of the emission surface;
       an outer surface that connects the incidence surface and the emission surface to each other and reflects the light incident onto the incidence surface toward the emission surface; and
       a protrusion that protrudes from an upper part of the outer surface and constitutes a part of the emission surface,
    wherein the support member encloses the outer surface, and
    wherein the lens is combined with the support member through the protrusion.

11. The LED package of claim 10, wherein the emission surface has a substantially square flat structure to correspond to the LED chip having a substantially square structure, and the illuminance controller comprises five lenses that are respectively disposed at a center region of the square flat structure and at four regions between a center and four vertexes of the substantially square flat structure.

12. The LED package of claim 10, wherein the emission surface is formed as a substantially flat surface, and the optical devices are lenses that have spherical or aspherical surfaces that are convex or concave with respect to the emission surface, or prisms having polygonal surfaces that are convex or concave with respect to the emission surface.

13. The LED package of claim 10, wherein the lens comprises a protrusion comprising:
    an outer surface that connects the incidence surface and the emission surface to each other and reflects the light incident onto the incidence surface toward the emission surface; and
    a surface that protrudes from an upper part of the outer surface and constitutes a part of the emission surface, and the LED package further comprises a support member that is combined with the PCB and encloses the outer surface,
    wherein the lens is combined with the support member through the protrusion.

14. The LED package of claim 10, wherein the incidence surface is formed along a recess that is dented toward the emission surface and comprises:
    a refractive surface that constitutes a bottom of the recess and is convex toward the LED chip; and
    an inner surface that is connected to the refractive surface to constitute a side of the recess, and the LED chip is spaced apart from the refractive surface.

15. A lens for controlling an illuminance distribution, wherein the lens is substantially parabolic-shaped when viewed in cross section, the lens comprising:
    a recess in a lower surface of the lens for receiving light emitted from a light-emitting device;
    a substantially flat upper surface and a plurality of convex regions disposed on the flat upper surface through which the light received from the light-emitting device is emitted; and
    a curved surface connecting the recess and the upper surface,
    wherein the curved surface reflects the light received from the light-emitting device toward the upper surface and the convex regions, and
    the light emitted from the upper surface is refracted at a first angle with respect to the upper surface, the light emitted from the convex regions is refracted at a second angle with respect to the upper surface, and the first angle is different from the second angle.

16. The lens of claim 15, wherein an upper surface of the recess is convex shaped.

17. The lens of claim 15, wherein the upper surface is substantially square-shaped as viewed in plan view.

18. The lens of claim 17, further comprising protrusions extending outward from each vertex of the substantially square-shaped upper surface in the plane of the upper surface.

19. The lens of claim 15, wherein the upper surface is substantially circular-shaped as viewed in plan view.

* * * * *